United States Patent
Cetinkaya

(10) Patent No.: US 8,712,660 B2
(45) Date of Patent: Apr. 29, 2014

(54) METHOD FOR MAINTAINING A DRIVER-INDEPENDENT BRAKING INTERVENTION AFTER A COLLISION

(75) Inventor: Ferah Cetinkaya, Ilsfeld (DE)

(73) Assignee: Robert Bosch GmbH, Stuttgart (DE)

(*) Notice: Subject to any disclaimer, the term of this patent is extended or adjusted under 35 U.S.C. 154(b) by 87 days.

(21) Appl. No.: 12/998,508

(22) PCT Filed: Sep. 1, 2009

(86) PCT No.: PCT/EP2009/061246
§ 371 (c)(1),
(2), (4) Date: Nov. 9, 2011

(87) PCT Pub. No.: WO2010/049193
PCT Pub. Date: May 6, 2010

(65) Prior Publication Data
US 2012/0046843 A1    Feb. 23, 2012

(30) Foreign Application Priority Data
Oct. 29, 2008   (DE) .......................... 10 2008 043 264

(51) Int. Cl.
*G06F 19/00*     (2011.01)
*B60Q 1/00*     (2006.01)

(52) U.S. Cl.
CPC .. *B60Q 1/00* (2013.01); *G06F 19/00* (2013.01)
USPC .............. 701/70; 180/275; 340/436; 340/903

(58) Field of Classification Search
USPC .............. 701/70–81, 300–302; 340/901–904, 340/933–943; 180/275
See application file for complete search history.

(56) References Cited

U.S. PATENT DOCUMENTS

| | | | | |
|---|---|---|---|---|
| 7,826,970 | B2* | 11/2010 | Kobayashi et al. | 701/300 |
| 7,894,988 | B2* | 2/2011 | Kimura et al. | 701/301 |
| 8,185,273 | B2* | 5/2012 | Lich et al. | 701/45 |
| 2001/0027372 | A1 | 10/2001 | Hellmann et al. | |
| 2004/0090320 | A1* | 5/2004 | Suzuki et al. | 340/435 |
| 2004/0167702 | A1* | 8/2004 | Isogai et al. | 701/96 |
| 2007/0032914 | A1* | 2/2007 | Kondoh et al. | 701/1 |
| 2008/0046145 | A1* | 2/2008 | Weaver et al. | 701/41 |
| 2009/0012684 | A1* | 1/2009 | Thiele | 701/70 |
| 2009/0265069 | A1* | 10/2009 | Desbrunes | 701/70 |
| 2010/0023226 | A1* | 1/2010 | Ito | 701/46 |
| 2010/0280726 | A1* | 11/2010 | Stabrey | 701/70 |
| 2010/0300794 | A1* | 12/2010 | Stabrey | 180/275 |
| 2011/0264347 | A1* | 10/2011 | Cetinkaya | 701/70 |
| 2011/0264348 | A1* | 10/2011 | Cetinkaya et al. | 701/70 |

FOREIGN PATENT DOCUMENTS

DE    197 53 971    6/1999

* cited by examiner

*Primary Examiner* — Thomas Tarcza
*Assistant Examiner* — Tyler J Lee
(74) *Attorney, Agent, or Firm* — Kenyon & Kenyon LLP

(57) ABSTRACT

In a method for maintaining a driver-independent braking intervention in a motor vehicle after a collision accelerator operation by the driver is detected; it is ascertained whether an engine torque influence via the accelerator can in fact be carried out; and when it is ascertained that the engine torque influence cannot be carried out, the driver-independent braking intervention is not broken off.

8 Claims, 1 Drawing Sheet

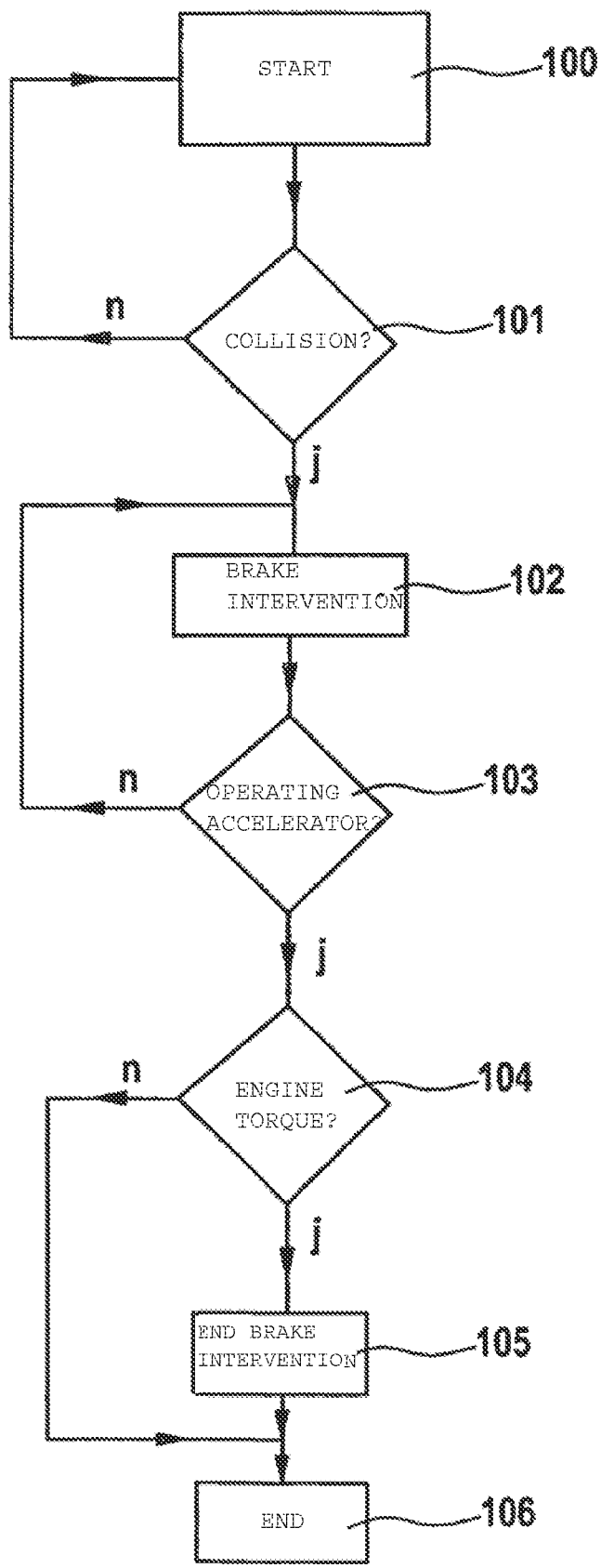

METHOD FOR MAINTAINING A DRIVER-INDEPENDENT BRAKING INTERVENTION AFTER A COLLISION

BACKGROUND OF THE INVENTION

1. Field of the Invention

The present invention relates to a method for maintaining a driver-independent braking intervention after a collision.

2. Description of Related Art

A method and a device for controlling the braking system of a motor vehicle are proposed in published German patent application document DE 197 53 971 A1, in which, when a collision situation is detected, braking force above the stipulation of the driver is built up, preferably up to a maximum value.

The "Vienna Agreement on Road Traffic" says, among other things: "Every driver must continuously control his vehicle or be able to lead his animals." For this reason, the acceleration command signaled by the driver by using the accelerator cannot be simply suppressed.

BRIEF SUMMARY OF THE INVENTION

The present invention relates to the situation in which, for one thing, because of a collision, a driver-independent braking force buildup takes place for safety reasons, and for another thing, the driver issues an acceleration command by the operation of the accelerator.

The present invention provides a method for maintaining a braking intervention in a motor vehicle that is carried out independently of the driver after a collision, in which:
an accelerator operation by the driver is recorded,
it is ascertained whether an engine torque influence via the accelerator is in fact possible;
if being able to carry out the engine torque influence is ascertained, the driver-independent braking intervention is broken off; and
if not being able to carry out the engine torque influence is ascertained, the driver-independent braking intervention is maintained, or rather, is not broken off. In the case of not being able to carry out the engine torque influence, the driver's command for acceleration is not implementable in principle. Therefore, for safety reasons, the driver-independent braking intervention is maintained in this case.

One advantageous refinement of the present invention is characterized by the fact that the braking intervention is an emergency braking. By the emergency braking it is tried to bring the vehicle to a standstill as quickly as possible, so as to avoid possible secondary collisions.

One advantageous embodiment of the present invention is characterized in that the engine torque influence is ascertained as not being able to be carried out if the energy supply of the drive engine has been interrupted.

One advantageous development of the present invention is characterized in that the energy supply of the drive engine is the fuel supply of an internal combustion engine.

One advantageous embodiment of the present invention is characterized in that the fuel supply to the internal combustion engine is not ascertained to be able to be carried cut if the fuel pump is detected to be shut down or defective.

One advantageous development of the present invention is characterized in that the energy supply of the drive motor is the supply of an electric motor with electrical energy. The present invention may be used both for conventional vehicles driven by an internal combustion engine and for electric vehicles or hybrid vehicles.

One advantageous embodiment of the present invention is characterized in that the driver-independent braking intervention is broken off when the engine torque influence is carried out via the accelerator. In this case, the requirement is taken into account that the driver should have control of his vehicle at all times, that is, an override of an implementable driver's command does not take place.

One advantageous refinement of the present invention is characterized in that the engine torque influence is an engine torque increase.

Furthermore, the present invention includes a device having means designed for implementing the methods recited above.

BRIEF DESCRIPTION OF THE DRAWINGS

The drawing encompasses FIG. 1. FIG. 1 shows the sequence of one example embodiment of the method according to the present invention.

DETAILED DESCRIPTION OF THE INVENTION

During investigations using test subjects, the presence of a collision was simulated using a sudden driver-independent intervention by active steering. This showed that a majority of the drivers had operated the accelerator instead of the brake pedal after the simulated collision.

The "Vienna Agreement on Road Traffic" says, among other things: "Every driver must continuously control his vehicle or be able to lead his animals".

For this reason, the acceleration command signaled by the driver by using the accelerator cannot be simply suppressed. In a meaningful manner, in the case of an accelerator operation by the driver after a collision, an emergency brake intervention activated by the collision or a braking assistant intervention are also broken off, in order not to let the acceleration torque originating with the driver's command work against the braking torques.

In numerous situations, however, a vehicle acceleration is no longer possible after a collision, because, for example, the fuel supply or the energy supply to the driving engine has been interrupted. This may have been effected by shutting down the fuel pump or by the failure of the injection system. Therefore, the driver-independent activated braking intervention is not reversed, in those cases in which the acceleration command made by the driver, using the operation of the accelerator, is technically no longer implementable, e.g. as a result of the interruption of the fuel supply to the internal combustion engine or, in the case of an electrically driven vehicle, as a result of interrupting the current supply to the drive motor.

The sequence of the method according to the present invention is shown in FIG. 1. After the start in block 100, in block 101 a query is made as to whether a collision has taken place. If no collision has taken place, the systems goes back to block 100. However, if a collision has taken place, a driver-independent braking intervention is carried out in block 102. Subsequently, it is ascertained in block 103 whether an operation of the accelerator by the driver is taking place. If the driver is not operating the accelerator, the system goes back to block 102, and the driver-independent braking intervention is continued. However, in block 103, if a gas or accelerator operation by the driver is detected, it is queried in block 104 whether an engine torque influence or an engine torque increase via the accelerator is in fact able to be carried out. If an engine torque influence is not able to be carried out, the system goes directly to block 106, in which the method ends, that is, the driver-independent braking intervention is not reversed and is continued. However, if an engine torque influence is able to be carried out, then in block 105 the driver-independent braking intervention is ended, and the method ends subsequently in block 106.

What is claimed is:

1. A method for automatic braking intervention in a vehicle having a drive engine, comprising:
   in response to a detection of a collision of the vehicle, initiating a driver-independent automatic braking intervention if a collision of the vehicle is detected;
   detecting an accelerator operation by the driver;
   detecting whether the drive engine is interrupted;
   ascertaining whether an engine torque influence via the accelerator is able to be carried out;
   if the engine torque influence is able to be carried out, ending the driver-independent braking intervention; and
   if the engine torque influence is not able to be carried out, maintaining the driver-independent automatic braking intervention;
   wherein the engine torque influence is ascertained as not being able to be carried out if an energy supply for the drive engine is interrupted.

2. The method as recited in claim 1, wherein the automatic braking intervention is an emergency braking.

3. The method as recited in claim 1, wherein the drive engine is an internal combustion engine, and wherein the energy supply is a fuel supply for the internal combustion engine.

4. The method as recited in claim 3, wherein the fuel supply for the internal combustion engine is ascertained as being interrupted if a fuel pump providing the fuel supply is detected to be defective.

5. The method as recited in claim 1, wherein the drive engine is an electric motor, and wherein the energy supply is a current supply for the electric motor.

6. The method as recited in claim 1, wherein the ending of the driver-independent braking intervention occurs during the carrying out of the engine torque influence via the accelerator.

7. The method as recited in claim 1, wherein the engine torque influence is an engine torque increase.

8. A system for controlling automatic braking intervention in a vehicle having a drive engine, comprising:
   means for initiating a driver-independent automatic braking intervention if a collision of the vehicle is detected in response to a detection of a collision of the vehicle;
   means for detecting an accelerator operation by the driver;
   means for detecting whether the drive engine is interrupted;
   means for ascertaining whether an engine torque influence via the accelerator is able to be carried out;
   means for ending the driver-independent automatic braking intervention if the engine torque influence is able to be carried out; and
   means for maintaining the driver-independent automatic braking intervention if the engine torque influence is not able to be carried out,
   wherein the engine torque influence is ascertained as not being able to be carried out if an energy supply for the drive engine is interrupted.

* * * * *

UNITED STATES PATENT AND TRADEMARK OFFICE
CERTIFICATE OF CORRECTION

PATENT NO. : 8,712,660 B2  Page 1 of 1
APPLICATION NO. : 12/998508
DATED : April 29, 2014
INVENTOR(S) : Ferah Cetinkaya It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 281 days.

Signed and Sealed this

Twenty-ninth Day of September, 2015

Michelle K. Lee
*Director of the United States Patent and Trademark Office*